(12) United States Patent
Yamada et al.

(10) Patent No.: US 7,771,521 B2
(45) Date of Patent: Aug. 10, 2010

(54) HYPERBRANCHED POLYIMIDE-BASED HYBRID MATERIAL

(75) Inventors: Yasuharu Yamada, Nagoya (JP); Tomoyuki Suzuki, Toyota (JP)

(73) Assignees: National University Corporation Nagoya Institute of Technology, Nagoya-shi (JP); Ibiden Co., Ltd., Ogaki-shi (JP)

( * ) Notice: Subject to any disclaimer, the term of this patent is extended or adjusted under 35 U.S.C. 154(b) by 424 days.

(21) Appl. No.: 11/680,187

(22) Filed: Feb. 28, 2007

(65) Prior Publication Data

US 2007/0149759 A1  Jun. 28, 2007

Related U.S. Application Data

(63) Continuation of application No. PCT/JP2005/015662, filed on Aug. 29, 2005.

(30) Foreign Application Priority Data

Aug. 30, 2004 (JP) .............................. 2004-251001
Aug. 30, 2004 (JP) .............................. 2004-251004

(51) Int. Cl.
*C08L 79/08* (2006.01)
*B01D 53/22* (2006.01)
*B01D 71/06* (2006.01)
*B01D 71/64* (2006.01)
*H01L 21/312* (2006.01)

(52) U.S. Cl. .............. 96/12; 96/13; 96/14; 210/500.21; 210/500.27; 210/500.28; 210/500.39; 525/420; 525/436

(58) Field of Classification Search .................. 525/420, 525/436; 96/12, 13, 14; 210/500.21, 500.27, 210/500.28, 500.39
See application file for complete search history.

(56) References Cited

U.S. PATENT DOCUMENTS

| 2002/0068795 A1 | 6/2002 | Won et al. |
| 2004/0247907 A1 | 12/2004 | Goda et al. |
| 2006/0057355 A1 | 3/2006 | Suzuki et al. |

FOREIGN PATENT DOCUMENTS

| JP | 57-15819 | 1/1982 |
| JP | 60-82103 | 5/1985 |
| JP | 60-257805 | 12/1985 |
| JP | 2001-316621 | 11/2001 |
| JP | 2002-265599 | 9/2002 |
| JP | 2004-059697 | 2/2004 |
| JP | 2004-59697 | 2/2004 |
| JP | 2004-277512 | 10/2004 |

OTHER PUBLICATIONS

Fang et al, Journal of Membrane Science, 2001, vol. 182, pp. 245-256.
Chen et al, Journal of Polymer Science, 2003, vol. 41, No. 13, pp. 2026-2035.
Yamada et al, Polymer Processing, 1997, vol. 46, No. 2, extra issue, pp. 2-11.

*Primary Examiner*—Ana L Woodward
(74) *Attorney, Agent, or Firm*—Oblon, Spivak, McClelland, Maier & Neustadt, L.L.P.

(57) ABSTRACT

It is an object of the present invention to provide a polyimide-based hybrid material which is industrially and advantageously utilized because of having better gas permeability, electric characteristics, heat resistance, mechanical strength, and the like as compared with the conventional polyimide-based hybrid materials, while keeping chemical resistance, forming characteristics (process characteristics), and the like inherently possessed by polyimide. Provided is a hyperbranched polyimide-based hybrid material constituted of an organic-inorganic polymer hybrid, wherein the organic-inorganic polymer hybrid has a hyperbranched polyimide moiety and an inorganic oxide moiety which are combining each other via covalent bond and constituting a composite structure.

11 Claims, 2 Drawing Sheets

X: Reactive residue
(amino group or acid anhydride group)

Y: Triamine residue
(imide bond as branch point)

X : Reactive residue
(amino group or acid anhydride group)

X' : Residue of alkoxy compound of Si, Mg, Al, Zr, or Ti
(crosslink point to inorganic oxide)

Y : Triamine residue
(imide bond as branch point)

HYPERBRANCHED POLYIMIDE-BASED HYBRID MATERIAL

This application is a continuation of the International Application No. PCT/JP2005/015662, filed Aug. 29, 2005, which claims the benefit under 35 U.S.C. §119(a)-(d) of Japanese Patent Application Nos. 2004-251001 and 2004-251004, both filed Aug. 30, 2004, the entireties of which are incorporated herein by reference.

TECHNICAL FIELD

The present invention relates to a hyperbranched polyimide-based hybrid material, and particularly to a hyperbranched polyimide-based hybrid material which is excellent in heat resistance, mechanical strength, electric characteristics, and gas permeability, and which comprises an organic-inorganic polymer hybrid having a hyperbranched structure in a molecule thereof.

BACKGROUND ART

As composite materials simultaneously having properties of organic polymer and inorganic compound, there have been conventionally, industrially and widely used mixtures of: a general-purpose polymer such as polyethylene (PE), polypropylene (PP), polystyrene (PS), poly(methyl methacrylate) (PMMA), nylon (PA), or polyester (PET); and an inorganic compound such as talc (calcium carbonate), clay, and silica. However, as materials exhibiting characteristics better than the conventional composite materials, there have been variously developed hybrid materials comprising organic-inorganic polymer hybrids, which have organic polymer moieties and inorganic oxide moieties combining each other and constituting composite structures (see Patent document 1).

As organic polymers in such organic-inorganic polymer hybrids, there have been utilized various polymers other than the conventional general-purpose polymers. For example, polyimides, which exhibit excellent gas permeability for gas separation application (see Patent document 2-4), have extremely excellent heat resistance, mechanical strength, electric characteristic, chemical resistance, and processing characteristic in addition to gas permeability, so that there have been developed various hybrid materials comprising organic-inorganic polymer hybrids based on polyimides (see Non-patent document 1). Polyimides in the conventional organic-inorganic polymer hybrids have been typically straight-chain (linear) polyimides which are respectively obtained by reacting: aromatic tetracarboxylic dianhydrides such as pyromellitic dianhydride and biphenyl tetracarboxylic dianhydride; and aromatic diamines such as diamino diphenyl ether.

Although the conventional hybrid materials comprising polyimide-based organic-inorganic polymer hybrids exhibit various excellent characteristics derived from composite structures including polyimide moieties and inorganic oxide moieties which combine each other, there are recently demanded novel hybrid materials exhibiting better characteristics, thereby leaving room for further investigation and improvement.

Patent document 1: JP-A-2004-277512
Patent document 2: JP-A-57-15819
Patent document 3: JP-A-60-82103
Patent document 4: JP-A-60-257805
Non-Patent document 1: Yamada, Yasuharu, and two others, "Property of silicon-containing polyimide, and application thereof", Extra issue of monthly "Polymer Processing", published by koubunshikankoukai, February 1997, vol. 46, No. 2, pp. 2-11

DISCLOSURE OF THE INVENTION

Problem to be Solved by the Invention

The present invention has been made in the light of the situations discussed above. It is therefore an object of the present invention to provide a polyimide-based hybrid material which is industrially and advantageously utilized on the ground of having better gas permeability, electric characteristic, heat resistance, and mechanical strength as compared with the conventional polyimide-based hybrid materials, while keeping chemical resistance and processing characteristic which polyimides have inherently.

Means for Solving the Problem

The present inventors have conducted intensive study and research in an effort to solve the above-mentioned problems. The present inventors have found that a hyperbranched polyimide-based hybrid material comprising an organic-inorganic polymer hybrid: wherein (i) a hyperbranched polyimide moiety comprising hyperbranched polyimide (see FIG. 1) having a dendritic structure which contains numerous molecular ends within one macromolecular unit, and (ii) an inorganic oxide moiety, combine each other by covalent bonds and constitute a composite structure; is extremely excellent gas permeability and electric characteristic as compared with the conventional polyimide-based hybrid materials, and enables creation of various high-performance materials.

The present invention was made based on the above findings, and a first form of the present invention provides, a hyperbranched polyimide-based hybrid material comprising an organic-inorganic polymer hybrid which has a hyperbranched polyimide moiety and an inorganic oxide moiety, the hyperbranched polyimide moiety and the inorganic oxide moiety combining each other via covalent bond and constituting a composite structure.

Also, in the second form according to the present invention, the organic-inorganic polymer hybrid is obtained by condensation polymerization and cyclodehydration of a hyperbranched polyamic acid having a hydroxyl group or an alkoxy group in at least one of a plurality of ends, and the hyperbranched polyamic acid is obtained by reacting: an aromatic tetracarboxylic dianhydride; an aromatic triamine; and an alkoxy compound of silicon, magnesium, aluminum, zirconium, or titanium, which has an amino group or a carboxyl group at an end, or a derivative of the alkoxy compound.

Moreover, in a third of the present invention, the organic-inorganic polymer hybrid is obtained by cyclodehydration of a reaction product which is obtained by sol-gel reaction, in the presence of water, of a hyperbranched polyamic acid having a hydroxyl group or an alkoxy group in at least one of a plurality of ends and at least one of alkoxides represented by the following formula, and the hyperbranched polyamic acid is obtained by reacting: an aromatic tetracarboxylic dianhydride; an aromatic triamine; and an alkoxy compound of silicon, magnesium, aluminum, zirconium, or titanium, which has an amino group or a carboxyl group at an end, or a derivative of the alkoxy compound.

$$R^1{}_m M(OR^2)_n \quad \text{formula;}$$

where
R$^1$, R$^2$: hydrocarbon group;
M: any atom of Si, Mg, Al, Zr, and Ti;
m: zero or positive integer;
n: positive integer; and
m+n: valence of the atom M.

In addition, in a fourth form of the present invention, the organic-inorganic polymer hybrid is obtained by sol-gel reaction, in the presence of water, of a hyperbranched polyimide and at least one of alkoxides represented by the following formula, the hyperbranched polyimide is obtained by cyclodehydration of a hyperbranched polyamic acid having a hydroxyl group or an alkoxy group at least one of a plurality of ends, and the hyperbranched polyamic acid is obtained by reacting: an aromatic tetracarboxylic dianhydride; an aromatic triamine; and an alkoxy compound of silicon, magnesium, aluminum, zirconium, or titanium, which has an amino group or carboxyl group at an end, or a derivative of the alkoxy compound.

$$R^1{}_m M(OR^2)_n \quad \text{formula;}$$

where
R$^1$, R$^2$: hydrocarbon group;
M: any atom of Si, Mg, Al, Zr, and Ti;
m: zero or positive integer;
n: positive integer; and
m+n: valence of the atom M.

Also, in a fifth form of the hyperbranched polyimide-based hybrid material according to the present invention, the organic-inorganic polymer hybrid is obtained by reacting: fine particles of inorganic oxide having a surface modified with an amino group or carboxyl group (including acid anhydride group; the same rule applies correspondingly to the following); an aromatic tetracarboxylic dianhydride; and an aromatic triamine.

Furthermore, the present invention also provides, a gas separation membrane, an insulating membrane for electronic material, and a heat-resistant adhesive, each comprising the hyperbranched polyimide-based hybrid material according to any one of the above-mentioned first through fifth forms.

Also, the present invention provides the hyperbranched polyimide-based hybrid material of the above-mentioned first through fifth forms, wherein the organic-inorganic polymer hybrid has reactive residues (amino group, acid anhydride group) at a plurality of ends thereof respectively, and at least one of the reactive residues is modified with 1) an amine, a carboxylic acid, a halide carboxylate, or a carboxylic anhydride, 2) an amine, a carboxylic acid, a halide carboxylate, or a carboxylic anhydride, which contains at least one of fluorine atoms respectively, or 3) an amine, a carboxylic acid, a halide carboxylate, or a carboxylic anhydride, which contains at least one of sulfonic acid groups respectively.

Further, the present invention provides a solid electrolyte membrane comprising the hyperbranched polyimide-based hybrid material according to the above-mentioned 3), namely the organic-inorganic polymer hybrid has reactive residues (amino group, acid anhydride group) at a plurality of ends thereof respectively, and at least one of the reactive residues is modified with an amine, a carboxylic acid, a halide carboxylate, or a carboxylic anhydride, which contains at least one of sulfonic acid groups respectively.

ADVANTAGEOUS EFFECT OF THE INVENTION

The hyperbranched polyimide-based hybrid material according to the present invention comprises an organic-inorganic polymer hybrid, wherein the organic-inorganic polymer hybrid has a hyperbranched polyimide moiety and an inorganic oxide moiety which combine each other via covalent bond and constitute a composite structure, so that the configuration of such a composite structure enables exhibition of remarkably excellent gas permeability, electric characteristic, heat resistance, mechanical strength, and adhesive property as compared with the conventional polyimide-based hybrid materials. Further, the hyperbranched polyimide-based hybrid material of the present invention is excellent not only in gas permeability but also in selective gas separation ability.

Therefore, the gas separation membrane, the insulating membrane for electronic material, and the heat-resistant adhesive, which comprise the hyperbranched polyimide-based hybrid material of the present invention having such excellent properties, also exhibit excellent properties. In addition thereto, the hybrid material is advantageously used as an industrial raw material of a coating material and a painting material.

Further, the hyperbranched polyimide-based hybrid material obtained by modifying the reactive residues (amino group, acid anhydride group) present at a plurality of ends of the organic-inorganic polymer hybrid with various compounds, are brought to effectively exhibit excellent properties other than the above-described properties. Concretely, the hyperbranched polyimide-based hybrid material comprising the organic-inorganic polymer hybrid wherein at least one of the reactive residues (amino group, acid anhydride group) is modified with an amine, a carboxylic acid, a halide carboxylate, or a carboxylic anhydride, which contains at least one of fluorine atoms respectively, exhibits an extremely low dielectric constant. And the hyperbranched polyimide-based hybrid material comprising the organic-inorganic polymer hybrid wherein at least one of the reactive residues is modified with an amine, a carboxylic acid, a halide carboxylate, or a carboxylic anhydride, which contains at least one of sulfonic acid groups respectively, is brought to have an excellent proton conductivity.

BEST MODE FOR CARRYING OUT THE INVENTION

Figure 1:
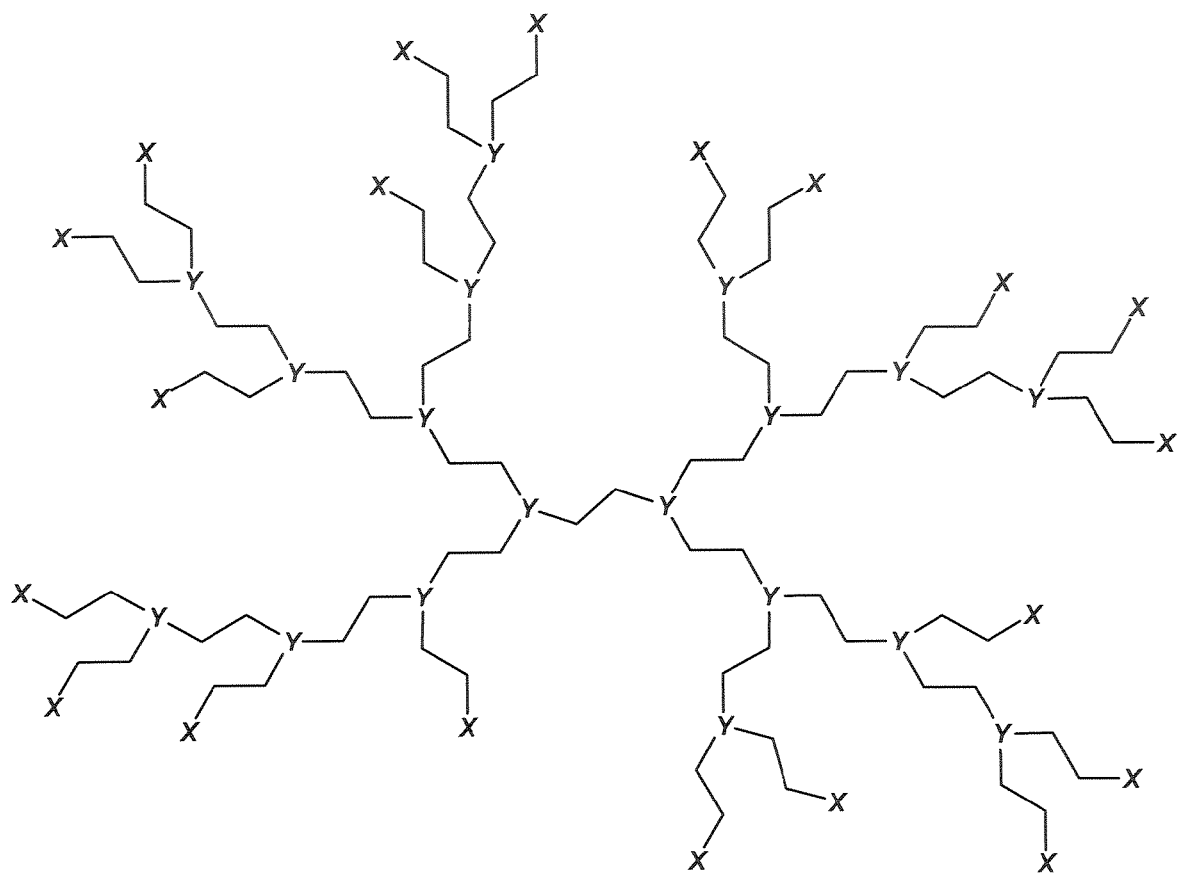
FIG. 1 is a schematic explanatory drawing of a structure of hyperbranched polyimide.
Figure 2:
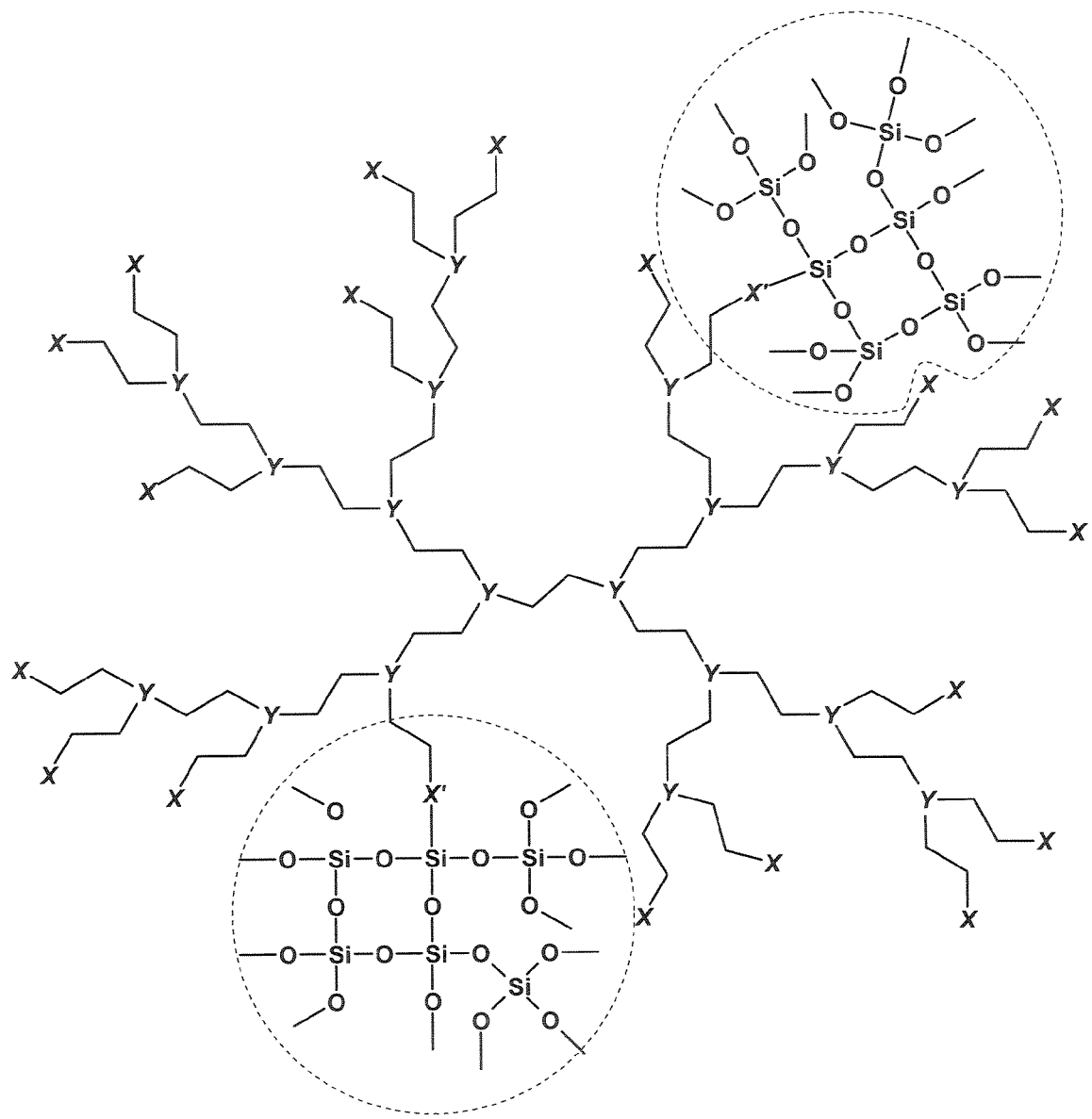
FIG. 2 is a schematic explanatory drawing of a structure of an exemplary hyperbranched polyimide-based hybrid material according to the present invention.

The hyperbranched polyimide-based hybrid material according to the present invention comprises an organic-inorganic polymer hybrid having a structure as shown in FIG. 2. As apparent from FIG. 2, the organic-inorganic polymer hybrid illustrated therein has a composite structure, which is provided by combining, by covalent bonds, a hyperbranched polyimide moiety comprising a hyperbranched polyimide which has a structure as shown in FIG. 1, and an inorganic oxide moiety (portions each encircled by a dotted line in FIG.

2) comprising an inorganic polymer constituted of $SiO_2$ units. The hyperbranched polyimide-based hybrid material comprising such an organic-inorganic polymer hybrid is advantageously produced by the following procedure.

Firstly, there is synthesized a hyperbranched polyamic acid by reacting an aromatic tetracarboxylic dianhydride with an aromatic triamine.

Usable as the aromatic tetracarboxylic dianhydride and as aromatic triamine in the present invention are any of conventionally known various ones. From among such known ones, one kind or two more kinds is/are appropriately selected and used, correspondingly to an intended hyperbranched polyimide-based hybrid material.

Concretely, examples of the aromatic tetracarboxylic dianhydride include compounds such as pyromellitic dianhydride (PMDA), oxydiphthalic dianhydride (OPDA), 3,3',4,4'-benzophenone tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), and 2,2'-bis[(dicarboxyphenoxy)phenyl]propane dianhydride (BSAA).

Further, examples of the aromatic triamine include aromatic compounds each including three amino groups in a molecule thereof, such as 1,3,5-triamino benzene, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene, and 1,3,5-tris(4-aminophenoxy)triazine.

Note that, together with the above-mentioned aromatic triamine, it is possible in the present invention to use, aromatic diamine, siloxane diamine, or an aromatic compound including four or more amino groups within a molecule, in a state copolymerized with the aromatic triamine, or in a manner to add the mentioned compound simultaneously with the aromatic triamine and the like upon synthesis of the polyamic acid. Examples of such an aromatic diamine include phenylene diamine, diamino phenylmethane, diamino diphenylether, diaminodiphenyl, diamino benzophenone, 2,2-bis[(4-aminophenoxy)phenyl]propane, bis[4-aminophenoxyphenyl]sulfone, 2,2-bis[(4-aminophenoxy)phenyl]hexafluoropropane, bis(4-aminophenoxy)benzene, 4,4'-[phenylene bis(1-methyl ethylidene)]bisaniline, 2,2-bis(4-aminophenyl)hexafluoropropane, and 9,9-bis(aminophenyl)fluorene; and examples of the siloxane diamine include (3-aminopropyl)tetramethyl disiloxane, bis(aminophenoxy) dimethylsilane, and bis(3-aminopropyl)polymethyl disiloxane. Further, examples of the aromatic compound having four or more amino groups in a molecule thereof, include tris(3,5-diaminophenyl)benzene, tris(3,5-diaminophenoxy)benzene.

It is also possible to use such derivatives in the present invention, which are each in a form that: a benzene ring in each of the above-mentioned aromatic tetracarboxylic dianhydride, aromatic triamine, aromatic diamine, and aromatic compound having four or more amino groups in a molecule thereof; has a substituent such as a hydrocarbon group (a alkyl group, a phenyl group, a cyclohexyl group, or the like), a halogen group, an alkoxy group, an acetyl group, or a sulfonic group The reaction of an aromatic tetracarboxylic dianhydride and an aromatic triamine (according to need, an aromatic diamine, a siloxane diamine, or an aromatic compound having four or more amino groups in a molecule thereof; which are hereinafter called "amine component" appropriately) is to be preferably conducted at a relatively low temperature, concretely at a temperature of 100° C. or lower, and desirably 50° C. or lower. Further, the aromatic tetracarboxylic dianhydride and the amine component are preferably reacted with each other at a reaction mole ratio ([aromatic tetracarboxylic dianhydride]:[amine component]) therebetween, to provide a quantitative ratio within a range from 1.0:0.3 to 1.0:1.2, preferably 1.0:0.4 to 1.0:1.1.

Production of the hyperbranched polyimide-based hybrid material according to the present invention, is desirably conducted in a predetermined solvent. Examples of the solvent usable in the present invention include: polar aprotic solvents such as N-methyl-2-pyrrolidone, N,N-dimethylacetamide, dimethyl formaldehyde, dimethyl sulfoxide, tetramethyl sulfone, hexamethyl sulfone, hexamethyl phosphoamide; phenol-based solvents such as m-cresol, o-cresol, m-chlorophenol, o-chlorophenol; and ether-based solvents such as dioxane, tetrahydrofuran, diglyme. Any one of, or any combination of these solvents may be used.

Next, the obtained hyperbranched polyamic acid is reacted with an alkoxy compound of silicon, magnesium, aluminum, zirconium, or titanium, which has an amino group or a carboxyl group at an end of molecule respectively (hereinafter also simply called "alkoxy compound"), or a derivative thereof.

Namely, at least one of acid anhydride groups or amino groups present at ends of the molecule of the hyperbranched polyamic acid reacts with the amino group or carboxyl group in the alkoxy compound, to provide a hyperbranched polyamic acid having an alkoxy group at at least part of a plurality of ends. Note that, in case of presence of water in the reaction system, a part of the alkoxy groups is hydrolyzed by such water and established into a hydroxyl group.

Here, it is possible in the present invention to use any one of conventionally known alkoxy compounds of silicon, magnesium, aluminum, zirconium, or titanium, which have an amino group or carboxyl group at an end of molecules respectively. Further, the alkoxy compound of silicon, magnesium, aluminum, zirconium, or titanium, which has a carboxyl group at an end of a molecule, is a carboxylic acid or acid anhydride having at an end thereof a functional group represented by a general formula: —COOH or a general formula: —CO—O—CO—; and acid halides (general formula: —COX; wherein X is any atom of F, Cl, Br, and I) which are derivatives thereof, are also usable in the present invention. Concretely, examples of the alkoxy compound of silicon include 3-aminopropyltrimethoxysilane, 3-aminopropyltriethoxysilane, aminophenyltrimethoxysilane, 3-aminopropylmethyldiethoxysilane, 3-aminophenyldimethylmethoxysilane, aminophenyltrimethoxysilane, (aminoethylaminomethyl) phenethyl trimethoxysilane, propyltrimethoxysilyl carboxylic acid, propylmethyldiethoxy silyl carboxylic acid, dimethylmethoxy silyl benzoic acid, and the like; and examples of the alkoxy compound of aluminum include those having structures as mentioned at a paragraph [0085] in JP-A-2004-114360. Further, examples of derivatives of the alkoxy compounds include various halogenides.

Note that the reaction between the above-mentioned alkoxy compound and the hyperbranched polyamic acid is desirably conducted under the similar temperature condition as that of the above explained reaction between the aromatic tetracarboxylic dianhydride and the amine component.

Then, the intended organic-inorganic polymer hybrid is obtained from the above obtained hyperbranched polyamic acid having an alkoxy group (or a hydroxyl group) at at least one of a plurality of ends of a molecule, and one or more kinds of predetermined alkoxides.

Namely, when the hyperbranched polyamic acid having an alkoxy group (or a hydroxyl group) at at least part of a plurality of ends of a molecule and the one or more kinds of predetermined alkoxides are made present within the same system in the presence of water, the alkoxy group in the hyperbranched polyamic acid molecule and the alkoxide are condensation polymerized by a sol-gel reaction, thereby forming an inorganic oxide moiety (an inorganic polymer constituted of $SiO_2$ units in FIG. 2) as shown in FIG. 2.

Then, by a heat treatment or chemical treatment subjecting to the hyperbranched polyamic acid having the inorganic oxide moiety formed in the above manner, reactive residues (amino group, acid anhydride group) which have been present in the polyamic acid molecules since synthesis thereof are cyclodehydrated, thereby obtaining an organic-inorganic polymer hybrid where the hyperbranched polyimide moiety and the inorganic oxide moiety combine each other by covalent bonds and constitute a composite structure.

Note that, upon production of the hyperbranched polyimide-based hybrid material according to the present invention, it is of course possible to conduct cyclodehydration of the hyperbranched polyamic acid, before conducting the condensation polymerization between the hyperbranched polyamic acid and an alkoxide by a sol-gel reaction. It is also possible to continuously conduct condensation polymerization (sol-gel reaction) of the hyperbranched polyamic acid and an alkoxide, and the cyclodehydration of the hyperbranched polyamic acid. Concretely, it is possible to add the alkoxide into a solution of the hyperbranched polyamic acid in a manner to stir the solution in a state kept at a relatively low temperature for a predetermined period of time, to thereby condensation polymerize the hyperbranched polyamic acid and alkoxide, and thereafter to heat the solution to thereby cyclodehydrate hyperbranched polyamic acid (condensation polymerized with the alkoxide) in the solution. Note that the sol-gel reaction between the hyperbranched polyamic acid and an alkoxide is preferably progressed by performing it at a temperature at 100° C. or lower, and advantageously 50° C. or lower.

Here, upon production of the hyperbranched polyimide-based hybrid material of the present invention, alkoxides are used which can be condensation polymerized between molecules in the presence of water, and represented by the following formula. Concretely, examples of the alkoxide include: dimethoxy magnesium, diethoxy magnesium, trimethoxy aluminum, triethoxy aluminum, tri-isopropoxy aluminum, tetramethoxy silane, tetraethoxy silane, tetramethoxy titanium, tetraethoxy titanium, tetra-isopropoxy titanium, tetramethoxy zirconium, tetraethoxy zirconium; and compounds such as alkyl substitution products of the compounds listed just above. One kind or two more kinds of such compounds is/are to be appropriately selected and used:

formula (1)

where
R$^1$, R$^2$: hydrocarbon group;
M: any atom of Si, Mg, Al, Zr, and Ti;
m: zero or positive integer;
n: positive integer; and
m+n: valence of the atom M.

Increasing/decreasing an adding amount of alkoxide, increased/decreased amount of inorganic oxide in a hyperbranched polyimide-based hybrid material is obtained. Generally, the inorganic oxide amount in such a hybrid material is within a range of 0.05 to 95 wt %, and desirably 0.1 to 50 wt %. Although the hyperbranched polyimide-based hybrid material is improved in heat resistance, elastic modulus, hardness, and the like as the amount of the inorganic oxide to be included is increased, the material is then rather made brittle such that occurrence of crack and deterioration of impact resistance may be caused. Thus, although the adding amount of the alkoxide is to be determined to attain an inorganic oxide amount within an appropriate range, the inorganic oxide amount is not particularly limited insofar as the hybrid material can be used and applied because a range varies depending on usage of the hybrid material.

The polyimide-based hybrid material of the present invention is usable in various applications such as a molding material, a film, a coating, a paint, an adhesive, and a separation membrane. In case of producing a polyimide-based hybrid material in a thin-film form for the purpose of using it as a film, coating, separation membrane, or the like, the hybrid material can be produced by the following methods similarly to typical polymer, such as polyimide, materials. Namely, examples of the methods include: 1) a method for flow expanding a reaction solution including the above-mentioned hyperbranched polyamic acid having an alkoxy group (or hydroxyl group) at least part of a plurality of ends, or a reaction solution including such a hyperbranched polyamic acid, alkoxide, and water, onto a substrate such as glass, or polymer film, and then heat-treat (heat and dry) the flow expanded solution; 2) a method for casting the solution onto a substrate such as glass, or polymer film, and then immersing the solution on the substrate in a receipt solvent such as water, alcohol, or hexane, followed by heat treatment (heating and drying); 3) a method for applying a heat treatment or the like to the reaction solution to thereby previously imidize (cyclodehydrate) the hyperbranched polyamic acid included in the reaction solution, and then casting such a solution to form a film followed by drying; and 4) a method for casting the solution, according to item 3) where the hyperbranched polyamic acid has been previously imidized, onto a substrate, and thereafter immersing the solution on the substrate in the same polymer receipt solvent as item 2) to bring the solution into a film, followed by a heat treatment (heating and drying); and any one of the methods is usable in the present invention.

Further, the hyperbranched polyimide-based hybrid material of the present invention produced in the above manner is capable of exhibiting more excellent gas permeability, gas selective permeability, electric characteristic (low dielectric constant), and heat resistance as compared with the conventional polyimide-based hybrid materials. Thus, such excellent effects are also exhibited by a gas separation membrane, an insulating membrane for electronic material, a heat-resistant adhesive, made of the hyperbranched polyimide-based hybrid material.

Note that, when the hyperbranched polyimide-based hybrid material of the present invention is used, it is of course possible to blend, into the hybrid material: polyimide having a structure different from the polyimide constituting the hybrid material; other resins; and conventionally known antioxidant, thermal stabilizer, ultraviolet absorber, filler, and the like.

While the exemplary embodiments of the present invention have been described in detail, the present invention is not limited to such embodiments as a matter of course.

For example, it is possible to produce the hyperbranched polyimide-based hybrid material of the present invention, by solely condensation polymerizing and cyclodehydrating the hyperbranched polyamic acid having a hydroxyl group or alkoxy group at at least one of a plurality of ends, without adding the predetermined alkoxide and water thereto. Note that, although water is required to be present upon condensation polymerization (sol-gel reaction) among hyperbranched polyamic acid molecules, the sol-gel reaction can be effectively progressed by water produced upon cyclodehydration within the hyperbranched polyamic acid molecules.

Further, the hyperbranched polyimide-based hybrid material of the present invention can also be produced by mutually reacting: inorganic oxide fine particles of inorganic oxide having a surface modified with an amino group or a carboxyl group (including acid anhydride group); aromatic tetracarboxylic dianhydride; and aromatic triamine.

For example, the aromatic tetracarboxylic dianhydride and the aromatic triamine are reacted with each other in the same manner as the above, to synthesize hyperbranched polyamic acid. Such a hyperbranched polyamic acid has reactive residues (amino group, acid anhydride group) at a plurality of ends, respectively. When the fine particles of inorganic oxide having a surface modified with an amino group or carboxyl group (including acid anhydride group) are added into a solution of such a hyperbranched polyamic acid, the reactive residues of the hyperbranched polyamic acid and the amino group(s) or carboxyl group(s) present at the surface of the fine particles of inorganic oxide are effectively reacted with one another, whereby a polymer having therein the hyperbranched polyamic acid and the fine particles of inorganic oxide combining each other by covalent bonds. By imidizing (cyclodehydrating) the obtained polymer, a hyperbranched polyimide-based hybrid material of the present invention is obtained.

Advantageously usable, then, as the inorganic oxide fine particles are spherical fine particulates comprising oxides such as magnesia, alumina, silica, zirconia, titania, zeolite, or the like, each having a submicron size (particle size) of 1 µm or less, and preferably a nano-order size of 100 nm or less, and more preferably 50 nm or less.

Further, the above obtained hyperbranched polyimide-based hybrid material can be made to exhibit various functions, by chemically modifying the reactive residues (amino group, acid anhydride group) at ends of the hyperbranched polyimide by various compounds to thereby provide the hyperbranched polyimide with functional groups.

For example, performing chemical modification by adopting compound of: an amine, a carboxylic acid, a halide carboxylate, or a carboxylic anhydride, which contains at least one of fluorine atoms or silicon atoms respectively; enables provision of surface characteristics such as more excellent low dielectric property, better water repellency, adhesive property, and the like.

Further, it is possible to provide protonic electrical conductivity by performing chemical modification by adopting a compound of an amine, a carboxylic acid, a halide carboxylate, or carboxylic anhydride, which contains at least one of sulfonic acid groups respectively.

Moreover, it is possible to produce a hyperbranched polyimide-based hybrid material having photosensitivity, by chemical modifying with a compound having photosensitivity. It is possible to produce various sensor materials, by chemical modifying with compounds having sensor functions. And it is possible to produce a hyperbranched polyimide-based hybrid material advantageously usable as an immobilized enzyme or a supported catalyst, by chemical modifying with a metallic compound to be matured into enzyme or catalyst component.

EXAMPLES

To further clarify the concept of the present invention, some examples of the invention will be described. It is to be understood that the invention is not limited to the details of illustrated examples and the foregoing description, but may be embodied with various changes, modifications and improvements, which may occur to those skilled in the art without departing from the scope of the invention defined in the attached claims.

Example 1

A three-necked flask of 100 mL provided with a stirrer, an introducing tube of nitrogen gas, and a calcium chloride tube was charged with 1.33 g of 4,4'-(hexafluoroisopropylidene) diphthalic dianhydride (6FDA), and 40 mL of dimethyl acetamide (DMAc) was added and dissolved therein. 1,3,5-tris(4-aminophenoxy)benzene (TAPOB): 0.64 g dissolved in 20 mL of DMAc was gradually added into the solution while stirring it, followed by stirring at 25° C. for 3 hours, whereby a hyperbranched polyamic acid was synthesized.

3-aminopropyltrimethoxysilane (APTrMOS): 0.072 g was added into the DMAc solution containing the hyperbranched polyamic acid, followed by additional stirring for two hours and a half, whereby a hyperbranched polyamic acid having a methoxysilyl group at at least one of a plurality of molecular ends of the compound (hereinafter called "silane-terminated hyperbranched polyamic acid"). The DMAc solution of the silane-terminated hyperbranched polyamic acid was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a polymer (sample 1) was obtained. The obtained polymer (sample 1) included 1.6 wt % of silica, evaluated in terms of silicon dioxide.

By measurement of infrared absorption spectrum in accordance with FT-IR for the sample 1, there were recognized absorptions at 1,784, 1,728, 1,379, and 722 $cm^{-1}$ which are characteristic of a carbonyl group of polyimide, while there was not recognized an absorption at 1,650 $cm^{-1}$ to be derived from a carbonyl group of polyimide. Further, there were recognized absorptions at 1,100 and 460 $cm^{-1}$ derived from a siloxane bond. From this result, the obtained sample 1 was confirmed to be a hyperbranched polyimide-silica hybrid according to the present invention.

A gas permeation measurement of the sample 1 was carried out in accordance with a constant volume method (JIS test method: JIS-Z-1707) under a condition of 1 atm and 25° C. The measurement result is shown in Table 1.

Further, ultraviolet-visible light transmittance for the sample 1 was measured, showing a light transmittance of 90% at a wavelength: 600 nm. Additionally, a differential scanning calorimetry (DSC measurement) and a thermogravimetry (TGA measurement) were carried out at a heating rate: 10° C./min, thereby showing a glass transition temperature ($T_g$) of 282° C. and a thermal decomposition temperature (5% weight loss temperature: $T_d^5$) of 457° C. Further, a thermal mechanical analysis (TMA) measurement was carried out in a nitrogen atmosphere at a heating rate: 5° C./min, thereby obtaining a coefficient of linear thermal expansion (CTE) of 52 ppm/° C. Moreover the sample 1 showed an extremely lower specific dielectric constant (1 MHz) of 2.7. The results obtained from the measurements are shown in Table 2. Note that the characteristics of the following Examples and Comparative Examples were measured under the same condition as Example 1.

Example 2

Tetramethoxy silane (TMOS): 0.063 g and water ($H_2O$): 0.045 g were added to the DMAc solution: 6.0 g of silane-terminated hyperbranched polyamic acid obtained by the same procedure as Example 1, followed by stirring at a room temperature for 24 hours. Thereafter, this mixed solution was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a polymer (sample 2) was obtained. The obtained polymer (sample 2) included 10 wt % of silica, evaluated in terms of silicon dioxide.

By measurement of infrared absorption spectrum in accordance with FT-IR for the sample 2, there was recognized the same FT-IR spectrum as the sample 1. From this result, the obtained sample 2 was confirmed to be a hyperbranched polyimide-silica hybrid according to the present invention.

The gas permeation measurement and the like, were also conducted for the sample 2. The results are shown in Table 1 and Table 2.

Examples 3 and 4

There were obtained two kinds of polymers (sample 3 and sample 4) under the same condition as Example 2, except for adoption of TMOS and $H_2O$ at amounts listed in Table 3, respectively. Also obtained for these samples were the same FT-IR spectra as the sample 2, thereby confirming that they were hyperbranched polyimide-silica hybrids according to the present invention, respectively. Measurement results of characteristics of the sample 3 and sample 4 are shown in Table 1 and Table 2.

Example 5

There was obtained a polymer (sample 5) under the same condition as Example 1, except for adoption of oxy-diphthalic dianhydride (OPDA): 0.93 g instead of 4,4'-(hexafluoroisopropylidene)diphthalic dianhydride (6FDA). The FT-IR spectrum of the obtained polymer (sample 5) was the same as the sample 1, thereby confirming that the sample 5 was a hyperbranched polyimide-silica hybrid according to the present invention. Further, the sample 5 included 1.8 wt % of silica, evaluated in terms of silicon dioxide. Measurement results of characteristics of the sample 5 are shown in Table 1 and Table 2.

Examples 6 to 8

Three kinds of polymers (sample 6 to sample 8) were obtained under the same condition as Example 2, except that TMOS and $H_2O$ of amounts listed in Table 3 were added to the DMAc solution: 6.0 g of silane-terminated hyperbranched polyamic acid obtained under the same condition as Example 5. The obtained sample 6 to sample 8 were each confirmed to be a hyperbranched polyimide-silica hybrid according to the present invention, by FT-IR measurement. Measurement results of characteristics of the samples are shown in Table 1 and Table 2.

Example 9

A three-necked flask of 100 mL provided with a stirrer, a nitrogen introducing tube, and a calcium chloride tube was charged with 1.33 g of 4,4'-(hexafluoroisopropylidene) diphthalic dianhydride (6FDA), and 40 mL of dimethyl acetamide (DMAc) was added and dissolved therein. 1,3,5-tris(4-aminophenoxy)benzene (TAPOB): 0.64 g dissolved in 20 mL of DMAc was gradually added into the solution while stirring it, followed by stirring at 25° C. for 3 hours. Thereafter, 3-aminopropyl trimethoxy silane (APTrMOS): 0.072 g was added into the solution, followed by stirring for one hour, and then 3,5-bis(trifluoromethyl)aniline (6FMA): 0.18 g was added, followed by further stirring for 2 hours, thereby reacting to modify at least one of molecular ends of the silane-terminated hyperbranched polyamic acid with 6FMA. The DMAc solution of the silane-terminated hyperbranched polyamic acid modified with 6FMA was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a polymer (sample 9) was obtained. The obtained polymer (sample 9) was confirmed to be a hyperbranched polyimide-silica hybrid according to the present invention, by FT-IR measurement. The sample 9 included 1.2 wt % of silica evaluated, in terms of silicon dioxide. Measurement results of physical properties of the sample 9 are shown in Table 1 and Table 2.

Examples 10 to 12

Three kinds of polymers (sample 10 to sample 12) were obtained under the same condition as Example 2, except that TMOS and $H_2O$ of amounts listed in Table 3 were added to the DMAc solution: 6.0 g of silane-terminated hyperbranched polyamic acid modified with 6FMA obtained in Example 9. All polymers were confirmed to be hyperbranched polyimide-silica hybrids according to the present invention, respectively, by FT-IR measurement for the polymers. Measurement results of physical properties of the samples 10 to 12 are shown in Table 1 and Table 2.

TABLE 1

| Sample No. | Gas permeability coefficient ($P \times 10^{-10} [cm^3(STP)cm/cm^2 \cdot sec \cdot cmHg]$) | | | | Gas selectivity ($\alpha$) | |
|---|---|---|---|---|---|---|
| | $CO_2$ | $O_2$ | $N_2$ | $CH_4$ | $O_2/N_2$ | $CO_2/CH_4$ |
| 1 | 7.4 | 1.5 | 0.23 | 0.098 | 6.8 | 75 |
| 2 | 10 | 2.0 | 0.31 | 0.13 | 6.6 | 79 |
| 3 | 13 | 2.1 | 0.32 | 0.16 | 6.7 | 82 |
| 4 | 23 | 3.0 | 0.46 | 0.24 | 6.6 | 95 |
| 5 | 0.63 | 0.13 | 0.013 | 0.0064 | 10.0 | 98 |
| 6 | 0.93 | 0.18 | 0.017 | 0.0094 | 110.0 | 98 |
| 7 | 0.87 | 0.17 | 0.017 | 0.0078 | 10.0 | 112 |
| 8 | 1.2 | 0.22 | 0.024 | 0.011 | 9.0 | 110 |
| 9 | 11 | 2.3 | 0.36 | 0.18 | 6.3 | 63 |
| 10 | 15 | 2.9 | 0.47 | 0.23 | 6.2 | 66 |
| 11 | 16 | 3.0 | 0.49 | 0.22 | 6.2 | 74 |
| 12 | 26 | 4.3 | 0.71 | 0.32 | 6.0 | 83 |

TABLE 2

| Sample No. | Content of silica [wt %] | $T_g$ [° C.] | $T_d^5$ [° C.] | Light transmittance [%] | CTE [ppm/° C.] | Specific dielectric constant [1 MHz] |
|---|---|---|---|---|---|---|
| 1 | 1.6 | 282 | 457 | 90 | 52 | 2.7 |
| 2 | 10 | 305 | 490 | 90 | 47 | 3.1 |
| 3 | 20 | 311 | 496 | 90 | 35 | — |
| 4 | 30 | 318 | 509 | 90 | 27 | — |
| 5 | 1.8 | 275 | 483 | 88 | — | 3.1 |
| 6 | 10 | 282 | 494 | 88 | — | 3.3 |
| 7 | 20 | 296 | 504 | 87 | — | — |
| 8 | 30 | 302 | 516 | 87 | — | — |
| 9 | 1.2 | 276 | 474 | 89 | — | 2.6 |
| 10 | 10 | 283 | 485 | 90 | — | 3.0 |
| 11 | 20 | 291 | 496 | 90 | — | — |
| 12 | 30 | 307 | 502 | 90 | — | — |

TABLE 3

| Sample No. | TMOS [g] | H₂O [g] |
| --- | --- | --- |
| 1 | — | — |
| 2 | 0.063 | 0.045 |
| 3 | 0.142 | 0.101 |
| 4 | 0.244 | 0.173 |
| 5 | — | — |
| 6 | 0.046 | 0.033 |
| 7 | 0.104 | 0.074 |
| 8 | 0.179 | 0.127 |
| 9 | — | — |
| 10 | 0.074 | 0.048 |
| 11 | 0.151 | 0.114 |
| 12 | 0.258 | 0.183 |

Comparative Example 1

A three-necked flask of 100 mL provided with a stirrer, an introducing tube of nitrogen gas, and a calcium chloride tube was charged with 1.33 g of 4,4'-(hexafluoroisopropylidene) diphthalic dianhydride (6FDA), and 40 mL of dimethyl acetamide (DMAc) was added and dissolved therein. 1,3,5-tris(4-aminophenoxy)benzene (TAPOB): 0.64 g dissolved in 20 mL of DMAc was gradually added into the solution while stirring it, followed by stirring at 25° C. for 3 hours, whereby a hyperbranched polyamic acid was synthesized.

The DMAc solution of the hyperbranched polyamic acid was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a hyperbranched polyimide (sample "a") was obtained. Characteristics of the obtained sample "a" were measured, and results thereof are shown in Table 4.

Comparative Example 2

A three-necked flask of 100 mL provided with a stirrer, an introducing tube of nitrogen gas, and a calcium chloride tube was charged with 1.33 g of 4,4'-(hexafluoroisopropylidene) diphthalic dianhydride (6FDA), and 30 mL of dimethyl acetamide (DMAc) was added and dissolved therein. 1,3,5-tris(4-aminophenoxy)benzene (TAPOB): 0.64 g dissolved in 20 mL of DMAc was gradually added into the solution while stirring it, followed by stirring at 25° C. for 3 hours, whereby a hyperbranched polyamic acid was synthesized. TMOS: 0.063 g and H₂O: 0.045 g were added to the DMAc solution: 6.0 g of the hyperbranched polyamic acid, followed by stirring at a room temperature for 24 hours. Thereafter, this mixed solution was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a compound (sample "b") was obtained. The obtained sample "b" was extremely brittle, and opaque, and was also low in film formability. The sample "b" included 12 wt % of silica, evaluated in terms of silicon dioxide.

By FT-IR measurement for the sample "b", there were recognized absorptions at 1,784, 1,728, 1,379, and 722 cm⁻¹ which are characteristic to a carbonyl group of polyimide, while there was not recognized an absorption at 1,650 cm⁻¹ to be derived from a carbonyl group of polyamic acid. Further, there were also recognized absorptions at 1,100 and 460 cm⁻¹ derived from a siloxane bond. From these results, the sample "b" without having covalent bonds between hyperbranched polyimide and silica, was confirmed to be a mixture of hyperbranched polyimide and silica. Characteristics of the sample "b" were measured, and results thereof are shown in Table 4.

Comparative Examples 3 and 4

Two kinds of compounds (sample "c" and sample "d") were obtained under the same condition as Comparative Example 2, except for addition of TMOS and H₂O at amounts shown in Table 5. These samples were opaque similarly to the sample "b", and were extremely brittle, thereby disabling formation thereof into films. FT-IR measurement was also conducted for the sample "c" and sample "d", and these samples were each confirmed to be a mixture of hyperbranched polyimide and silica based on the measurement results. Measurement results of characteristics of the sample "c" and sample "d" are shown in Table 4.

Comparative Example 5

A three-necked flask of 100 mL provided with a stirrer, a nitrogen introducing tube, and a calcium chloride tube was charged with 1.33 g of 6FDA, and 15 mL of DMAc was added and dissolved therein. 1,3-bis(4-aminophenoxy)benzene (TPER): 0.804 g was gradually added into the solution while stirring it, followed by stirring at 25° C. for 3 hours, whereby a straight-chain polyamic acid was synthesized.

APTrMOS: 0.089 g was added into the DMAc solution of the straight-chain polyamic acid, followed by stirring for 2 hours, whereby a straight-chain polyamic acid (silane-terminated straight-chain polyamic acid) having ends established into trimethoxysilyl groups. The DMAc solution of the silane-ended straight-chain polyamic acid was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a polymer (sample "e") was obtained. The polymer (sample "e") included 1.8 wt % of silica evaluated in terms of silicon dioxide. Conduction of FT-IR measurement for the sample "e" gave the same FT-IR spectrum as Comparative Example 2, so that the sample "e" was confirmed to be a hybrid (straight-chain polyimide-silica hybrid) comprising straight-chain polyimide and silica. Measurement results of characteristics of the sample "e" are shown in Table 4 and Table 6.

Comparative Example 6

TMOS: 0.061 g and H₂O: 0.043 g were added to the DMAc solution: 1.5 g of the straight-chain polyamic acid obtained in Comparative Example 5, followed by stirring at a room temperature for 24 hours. Thereafter, this mixed solution was cast onto a polyester film, and dried at 85° C. for 2 hours, followed by application of heat treatment in a nitrogen atmosphere at 100° C. for 1 hour, at 200° C. for 1 hour, and at 300° C. for 1 hour, whereby a polymer (sample "f") was obtained. The polymer included 10 wt % of silica, evaluated in terms of silicon dioxide.

FT-IR measurement was also conducted for the sample "f", and as a result, the sample "f" was confirmed to be a straight-chain polyimide-silica hybrid. Characteristics of the sample "f" were measured, and results thereof are shown in Table 4 and Table 6.

Comparative Examples 7 and 8

Polymers (sample "g" and sample "h") were obtained under the same condition as Comparative Example 6 except for addition of TMOS and H$_2$O at amounts shown in Table 5. These samples "g" and "h" were also each confirmed to be a straight-chain polyimide-silica hybrid, such as based on results of FT-IR measurement. Physical properties of the samples "g" and "h" were measured, and results thereof are shown in Table 4 and Table 6.

TABLE 4

| Sample | Content of silica [wt %] | $T_g$ [° C.] | $T_d^5$ [° C.] | Light transmittance [%] | CTE [ppm/° C.] | Specific dielectric constant [1 MHz] |
|---|---|---|---|---|---|---|
| a | — | 251 | 453 | 89 | 55 | 3.0 |
| b | 12 | 252 | 453 | 60 | — | — |
| c | 20 | 241 | 446 | 25 | — | — |
| d | 30 | 248 | 451 | 19 | — | — |
| e | 1.8 | 247 | 490 | 89 | 59 | 3.0 |
| f | 10 | 249 | 505 | 88 | 55 | 3.2 |
| g | 20 | 254 | 513 | 85 | 45 | — |
| h | 30 | 255 | 514 | 82 | 37 | — |

TABLE 5

| Sample | TMOS [g] | H$_2$O [g] |
|---|---|---|
| b | 0.063 | 0.045 |
| c | 0.142 | 0.101 |
| d | 0.244 | 0.173 |
| e | — | — |
| f | 0.061 | 0.043 |
| g | 0.138 | 0.098 |
| h | 0.237 | 0.168 |

TABLE 6

| | Gas permeation coefficient (P × 10$^{-10}$[cm$^3$(STP)cm/ cm$^2$ · sec · cmHg]) | | | | Separation coefficient ($\alpha$) | |
|---|---|---|---|---|---|---|
| Sample | CO$_2$ | O$_2$ | N$_2$ | CH$_4$ | O$_2$/N$_2$ | CO$_2$/CH$_4$ |
| e | 5.5 | 1.1 | 0.16 | 0.085 | 6.9 | 65 |
| f | 5.9 | 1.1 | 0.17 | 0.088 | 6.4 | 67 |
| g | 6.4 | 1.2 | 0.18 | 0.088 | 6.7 | 73 |
| h | 8.3 | 1.4 | 0.19 | 0.11 | 7.0 | 76 |

From comparison between the sample 1 (hyperbranched polyimide-silica hybrid) and the sample "a" (hyperbranched polyimide), it is understood that hybridization of hyperbranched polyimide with silica extremely improves electric characteristics of the former (specific dielectric constant is lowered). Further, comparing the samples 2 to 8 (hyperbranched polyimide-silica hybrid) with the samples "b" to "d" (mixture of hyperbranched polyimide and silica), although remarkable increments of $T_g$ and $T_d^5$ were recognized and thus improvement of heat resistance was recognized as the content of silica is increased in each of the samples 2 to 8 according to the present invention, such a remarkable increment was not recognized in the samples "b" to "d" which are each a simple mixture of hyperbranched polyimide and silica. Also in the samples "e" to "h" (straight-chain polyimide-silica hybrid), there is not recognized such a remarkable elevation in the samples 2 to 8. This is considered to be caused by a fact that many ends are present in one molecule of hyperbranched polyimide so that inter-molecular crosslinks are apt to be formed through silica by virtue of APTrMOS sites introduced into the molecule.

Comparing the samples 2 to 12 (hyperbranched polyimide-silica hybrid) with the samples "b" to "d" (mixture of hyperbranched polyimide and silica), while considerable deterioration of light transmittance was recognized in each of samples "b" to "d" as a silica content was increased, any deterioration of light transmittance was never recognized in the samples 2 to 12 according to the present invention, and even such samples including higher contents of silica kept extremely high transparency. Based thereon, it is considered that APTrMOS parts introduced into ends of hyperbranched polyimide serve to enhance an affinity thereof with silica, to restrict separation of a polyimide moiety and a silica moiety (inorganic oxide moiety), and to keep higher transparency.

Further, the samples 2 to 12 (hyperbranched polyimide-silica hybrid) are each recognized to have better light transmittance, even when compared with the samples "e" to "h" (straight-chain polyimide-silica hybrid). Based thereon, it is assumed that a silica moiety present in each of the samples 2 to 12 is extremely fine and forms an extremely homogeneous hybrid matrix.

The samples 1, 2, 5, and 6 (hyperbranched polyimide-silica hybrid) each exhibit a specific dielectric constant equal to or lower than those of the samples "e" to "h" (straight-chain polyimide-silica hybrid). Particularly, the sample 1 having a lower content of silica was recognized to be extremely low in specific dielectric constant.

In the samples 2 to 8 (hyperbranched polyimide-silica hybrid), gas permeability was recognized to be improved as a content of silica was increased. Further, comparing the samples 2 to 4 (hyperbranched polyimide-silica hybrid) with the samples "f" to "h" (straight-chain polyimide-silica hybrid) in terms of gas permeability coefficient, the samples 2 to 4 according to the present invention are recognized to be more excellent. Moreover, the samples 2 to 4 according to the present invention were also more excellent in CO$_2$/CH$_4$ selectivity. Based thereon, it is assumed that free-volume holes formed at an interface between a hyperbranched polyimide phase and a silica phase in each of the samples 2 to 4 (hyperbranched polyimide-silica hybrid) are in sizes extremely effective for CO$_2$/CH$_4$ separation.

Furthermore, the sample 9 (hyperbranched polyimide-silica hybrid modified with 6FMA) was confirmed to exhibit an extremely low dielectric constant, thereby proving that modification of ends of hyperbranched polyimide-silica hybrid molecules with a fluorine-containing compound is extremely effective for lowering a specific dielectric constant.

Example 13

A three-necked flask of 50 mL having a stirrer, a nitrogen introducing tube, and a calcium chloride tube was charged with 0.89 g of 4,4'-(hexafluoroisopropylidene)diphthalic dianhydride (6FDA), and 20 mL of dimethyl acetamide (DMAc) was added and dissolved therein. 1,3,5-tris(4-aminophenoxy)benzene (TAPOB): 0.43 g dissolved in 20 mL of DMAc was gradually added into the solution while stirring it, followed by stirring at 25° C. for 2 hours. Thereafter, 3-aminopropyl trimethoxy silane (APTrMOS): 0.048 g was added, followed by stirring for 3 hours. Added to the solution were sulfanilic acid: 0.134 g and triethylamine: 0.094 g, followed by reaction at 50° C. for 10 hours, to thereby modify at least one of a plurality of molecular ends of hyperbranched polyamic acid with sulfanilic acid. The DMAc solution of the hyperbranched polyamic acid modified with sulfonic acid was cast onto a polyester film, and dried at 80° C. for 3 hours, followed by application of heat treatment in a nitrogen atmosphere at 100° C. for 1 hour, at 200° C. for 1 hour, and at 300°

C. for 1 hour, whereby a sulfonic acid-modified hyperbranched polyimide-silica hybrid film was obtained. The hybrid included 1.2 wt % of silica, evaluated in terms of silicon dioxide.

By FT-IR measurement for the obtained hybrid film, there were recognized absorptions at 1,784, 1,728, 1,379, and 722 cm$^{-1}$ which are characteristic to a carbonyl group of polyimide; absorptions at 1,100 and 460 cm$^{-1}$ derived from a siloxane bond; and an absorption at 1,035 cm$^{-1}$ derived from a sulfonic group, while there was not recognized an absorption at 1,650 cm$^{-1}$ to be derived from a carbonyl group of polyamic acid.

The sulfonic acid-modified hyperbranched polyimide-silica hybrid film was measured for a proton conductivity (25° C., frequency: 100 kHz) by an LCR measuring device (532LCR HITESTER: made by HIOKI), to show a value of 1.65×10$^{-4}$ Scm$^{-1}$.

Example 14

There was produced a sulfonic acid-modified hyperbranched polyimide-silica hybrid film under the same condition as Example 13, except for adoption of 0.62 g of oxydiphthalic dianhydride (ODPA) instead of 6FDA. The hybrid included 1.5 wt % of silica, evaluated in terms of silicon dioxide.

Conduction of FT-IR measurement for the obtained hybrid film gave the same result as Example 13. Further, measurement of proton conductivity under the same condition as Example 13 gave a value of 4.95×10$^{-4}$ Scm$^{-1}$.

What is claimed is:

1. A hyperbranched polyimide-based hybrid material, comprising an organic-inorganic polymer hybrid, which comprises:
   a hyperbranched polyimide moiety; and
   an inorganic oxide moiety;
   wherein:
   the hyperbranched polyimide moiety and the inorganic oxide moiety are connected via a covalent bond;
   the organic-inorganic polymer hybrid is obtained by condensation polymerization and cyclodehydration of a hyperbranched polyamic acid comprising a hydroxyl group or an alkoxy group at least one of a plurality of ends;
   the hyperbranched polyamic acid comprising the hydroxyl group or the alkoxy group is obtained by:
      reacting an aromatic tetracarboxylic dianhydride and an aromatic triamine to obtain a hyperbranched polyamic acid; and
      reacting the hyperbranched polyamic acid with an alkoxy compound or a derivative of the alkoxy compound to obtain the hyperbranched polyamic acid comprising the hydroxyl group or the alkoxy group;
   the alkoxy compound comprises silicon, magnesium, aluminum, zirconium, or titanium and further comprises an amino group or a carboxyl group at an end; and
   the aromatic triamine compound comprises at least one member selected from the group consisting of tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene and 1,3,5-tris(4-aminophenoxy) triazine.

2. The hyperbranched polyimide-based hybrid material according to claim 1,
   wherein:
   obtaining the organic-inorganic polymer hybrid by condensation polymerization and cyclodehydration comprises carrying out cyclodehydration of a reaction product obtained carrying out a sol-gel reaction, in the presence of water, of the hyperbranched polyamic acid comprising a hydroxyl group or an alkoxy group at least one of a plurality of ends and at least alkoxide represented by the following formula:

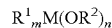

where:
   R$^1$ is a hydrocarbon group;
   R$^2$ is a hydrocarbon group;
   M is selected from Si, Mg, Al, Zr, and Ti;
   m is zero or positive integer;
   n is a positive integer; and
   m+n is equal to a valence of M.

3. The hyperbranched polyimide-based hybrid material according to claim 1,
   wherein:
   obtaining the organic-inorganic polymer hybrid by condensation polymerization and cyclodehydration comprises carrying out a sol-gel reaction, in the presence of water, of a hyperbranched polyimide and at least one alkoxide represented by the following formula;

where:
   R$^1$ is a hydrocarbon group;
   R$^2$ is a hydrocarbon group;
   M is selected from Si, Mg, Al, Zr, and Ti;
   m is zero or positive integer;
   n is a positive integer; and
   m+n is equal to a valence of M; and
   the hyperbranched polyimide is obtained by cyclodehydration of the hyperbranched polyamic acid having a hydroxyl group or an alkoxy group at least one of a plurality of ends.

4. The hyperbranched polyimide-based hybrid material according to claim 1,
   wherein the alkoxy compound comprising silicon, magnesium, aluminum, zirconium, or titanium, or the derivative of the alkoxy compound, comprises fine particles of an inorganic oxide surface-modified with an amino group or a carboxyl group.

5. A gas separation membrane comprising the hyperbranched polyimide-based hybrid material according to claim 1.

6. An insulating membrane for an electronic material comprising the hyperbranched polyimide-based hybrid material according to claim 1.

7. A heat-resistant adhesive comprising the hyperbranched polyimide-based hybrid material according to claim 1.

8. The hyperbranched polyimide-based hybrid material according to claim 1, wherein:
   the organic-inorganic polymer hybrid has reactive residues at a plurality of ends; and
   at least one of the reactive residues is modified with an amine, a carboxylic acid, a halide carboxylate, or a carboxylic anhydride.

9. The hyperbranched polyimide-based hybrid material according to claim 1, wherein:
   the organic-inorganic polymer hybrid comprises reactive residues at a plurality of ends; and at least one of the reactive residues comprises a fluorine-containing amine, carboxylic acid, halide carboxylate, or carboxylic anhydride.

10. The hyperbranched polyimide-based hybrid material according to claim 1, wherein:
 the organic-inorganic polymer hybrid comprises reactive residues at a plurality of ends; and
 at least one of the reactive residues comprises a sulfonic group-containing amine, carboxylic acid, halide carboxylate, or carboxylic anhydride.

11. A solid electrolyte membrane comprising the hyperbranched polyimide-based hybrid material according to claim 1, wherein:
 the organic-inorganic polymer hybrid comprises reactive residues at a plurality of ends; and
 at least one of the reactive residues comprises a sulfonic-group containing amine, carboxylic acid, halide carboxylate, or carboxylic anhydride.

* * * * *